US009899869B1

(12) United States Patent
McCracken et al.

(10) Patent No.: US 9,899,869 B1
(45) Date of Patent: Feb. 20, 2018

(54) PHOTO VOLTAIC (PV) ARRAY-SHEDDING AND STORAGE SYSTEM

(71) Applicant: Bentek Corporation, San Jose, CA (US)

(72) Inventors: Douglas Eugene McCracken, San Jose, CA (US); Louis David Marzano, Palo Alto, CA (US); John Herbert Buckley, Austin, TX (US)

(73) Assignee: Bentek Corporation, San Jose, CA (US)

( * ) Notice: Subject to any disclaimer, the term of this patent is extended or adjusted under 35 U.S.C. 154(b) by 581 days.

(21) Appl. No.: 14/476,556

(22) Filed: Sep. 3, 2014

(51) Int. Cl.
*H02J 7/00* (2006.01)
*H02J 9/06* (2006.01)
*H02M 7/42* (2006.01)

(52) U.S. Cl.
CPC ............ *H02J 9/061* (2013.01); *H02M 7/42* (2013.01)

(58) Field of Classification Search
CPC .... H02J 9/062; H02J 9/061; H02J 9/06; H02J 7/34; G06F 1/30
USPC ........................................................ 307/66
See application file for complete search history.

(56) References Cited

U.S. PATENT DOCUMENTS

| | | | | |
|---|---|---|---|---|
| 2008/0143188 A1* | 6/2008 | Adest | ...................... | H02J 1/102 307/82 |
| 2008/0150366 A1* | 6/2008 | Adest | ...................... | H02J 3/383 307/77 |
| 2009/0141522 A1* | 6/2009 | Adest | ...................... | H02J 1/102 363/55 |
| 2009/0206666 A1* | 8/2009 | Sella | .................. | H01L 31/02021 307/43 |
| 2012/0051095 A1* | 3/2012 | Steigerwald | .......... | H02M 3/158 363/21.01 |
| 2012/0068543 A1* | 3/2012 | Caraglio | .................. | H02J 3/383 307/71 |
| 2012/0161527 A1* | 6/2012 | Casey | ............... | H01L 31/02021 307/80 |
| 2013/0114312 A1* | 5/2013 | Reichard | ................... | G05F 1/67 363/37 |
| 2013/0193765 A1* | 8/2013 | Yoscovich | .............. | H02M 7/42 307/75 |
| 2014/0015324 A1* | 1/2014 | Brennan | .................. | H02J 3/383 307/72 |

(Continued)

*Primary Examiner* — Thienvu Tran
*Assistant Examiner* — Brian K Baxter
(74) *Attorney, Agent, or Firm* — Brundidge & Stanger, PC.

(57) ABSTRACT

The present invention provides for a photovoltaic system and circuit having array shedding functionality. The system and circuit, in general, have at least two photovoltaic strings, at least one inverter; and, an array shedding and harvesting functionality configured to monitor the inverter and either disconnect or connect inputs of the at least two photovoltaic strings as needed to produce power for the at least one inverter or to produce power for storage. The array shedding and harvesting functionality is preferably integrated between photovoltaic (PV) strings and the output of the inverter. Various embodiments provide for sensors integrated on each of the inputs of a power assembly combiner, current sensors used to sense current provided on each of multiple inputs from power sources (PV arrays or combiners), and direct current (DC) contactors used to control connection of power source inputs.

18 Claims, 13 Drawing Sheets

(56) References Cited

U.S. PATENT DOCUMENTS

| | | | | |
|---|---|---|---|---|
| 2014/0265595 A1* | 9/2014 | Cheng | ............... | H02J 9/00 307/66 |
| 2014/0306543 A1* | 10/2014 | Garrity | ............... | H02M 7/44 307/82 |
| 2015/0288225 A1* | 10/2015 | Dent | ............... | H02M 1/32 307/66 |
| 2016/0254672 A1* | 9/2016 | Yoscovich | ............... | H02M 3/04 307/77 |
| 2016/0372970 A9* | 12/2016 | Dent | ............... | H02J 9/061 |

\* cited by examiner

PHOTO VOLTAIC (PV) ARRAY-SHEDDING AND STORAGE SYSTEM

FIELD OF THE INVENTION

The present invention relates to power systems, and more particularly to photovoltaic arrays and circuits.

BACKGROUND

A photovoltaic (PV) array, often referred to as a solar array, is composed of a plurality or an array of photovoltaic modules (i.e., panels) which convert solar radiation to usable current, often direct current (DC). An inverter is often employed to enable the delivery of alternating current (AC) from such PV systems, particularly for grid-connected applications.

Though many PV systems are designed to support a predetermined power and current, based on the needs of the application, often optimizing for the maximum allowable power is a challenge. In part, challenges arise based on the complexity of individual power and current inputs into a system, the monitoring of power and current, and the fluctuations due to solar light availability. Designers, in traditional approaches, may further supplement their efforts in such an approach by specifically designing for the peak period (i.e., when the sun is at its peak) which can be disadvantageous because the peak period is a short period of time.

Unfortunately, maintaining the duration of operation at maximum power is often a challenge. Therefore what is desired is an improved system and circuit that provides for increasing the duration of operation at maximum power, thereby providing a longer time with higher output power from the combiner to the inverter so as to increase the maximum yield time to the inverter. What is further desired is an approach that will also provide for compensation in situations having for lower-yield environmental factors, such as sun blockage from clouds, or lower sun angles due to seasonal effects.

SUMMARY

The present invention fulfills these needs and has been developed in response to the present state of the art, and in particular, in response to the problems and needs in the art that have not yet been fully solved by currently available technologies.

In one embodiment, the present invention provides for a photovoltaic system having at least two photovoltaic strings, at least one inverter; and, an array shedding and harvesting functionality configured to monitor the inverter and either disconnect or connect inputs of the at least two photovoltaic strings as needed to produce a maximum amount of allowable power to produce power for storage.

In another embodiment, the present invention further provides for a photovoltaic system wherein the at least two photovoltaic strings comprise a plurality of photovoltaic strings. The system further includes two string combiners coupled to the plurality of photovoltaic strings and at least one array combiner between the at least two string combiners and the inverter.

In a further embodiment, the present invention further provides for a photovoltaic system having a sensor circuit including a current sensor coupled to the inputs of the at least two photovoltaic strings and a voltage sensor coupled to an output bus; a controller for receiving signals from the current sensor and voltage sensor; and, a plurality of contactors coupled to inputs of the at least two photovoltaic strings and the controller. In a preferred embodiment, the controller of the system connects or disconnects one or more contactors based upon whether a predetermined threshold is reached based upon measurements by the current sensor and the voltage sensor. In still a further embodiment, the present invention is a photovoltaic array shedding and harvesting circuit. The circuit comprises at least one current sensor for sensing each input of at least two photovoltaic strings, at least one voltage sensor connected to a common output bus, and an inverter switch for integrating an inverter and a program logic to monitor and control the inverter and either disconnect or connect each input of the at least two photovoltaic strings as needed, to provide maximum allowable power or to produce power for storage.

In a further preferred embodiment, the present invention comprises a circuit having array shedding and harvesting functionality wherein when a value of system power input to the inverter exceeds a predetermined upper threshold limit; the program logic will open a first contactor and remove a first power input.

DETAILED DESCRIPTION

The present invention relates to array shedding photovoltaic systems and circuits having array shedding functionality configured to monitor the inverter and either disconnect or connect inputs of the at least two photovoltaic strings as needed to maintain a maximum allowable power.

Various modifications to the preferred embodiments and the generic principles and features described herein will be readily apparent to those skilled in the art. Thus, the present embodiments are not intended to be limited to the examples shown but are to be accorded the widest scope consistent with the principles and features described herein.

As used herein, the terms "include," "including," "for example," "e.g.," and variations thereof, are not intended to be terms of limitation, but rather are intended to be followed by the words "without limitation."

The present invention provides for an array-shedding system and storage system which increases the duration of operation at maximum power, yielding a longer period of operation with higher output power from the combiner to the inverter, increasing the maximum yield time to the inverter and also allows for harvesting power for later use. Advantages of the present invention include that designers are not restricted to designing a system solution specific to the peak output (i.e., when the sun is peaked) but rather may design for an array-shedding solution of the present invention which provides for maintaining maximum output power over a longer period of time.

An array shedding and storage approach, as in the present invention, may beneficially be implemented where a charge controller function is broken down in sub-array controllers (i.e., inputs) which may then be sequentially disconnected by the circuit of the present invention as a battery source becomes actively charged, for instance. In operation, an array shedding approach of the present invention allows designers to attempt to provide for better output power over a longer period of time. The present invention provides for accurately providing for the proper power and current and providing for monitoring current and voltage into the inverter such that the individual inputs may be disconnected as needed to maintain maximum allowable power.

Figure 1:
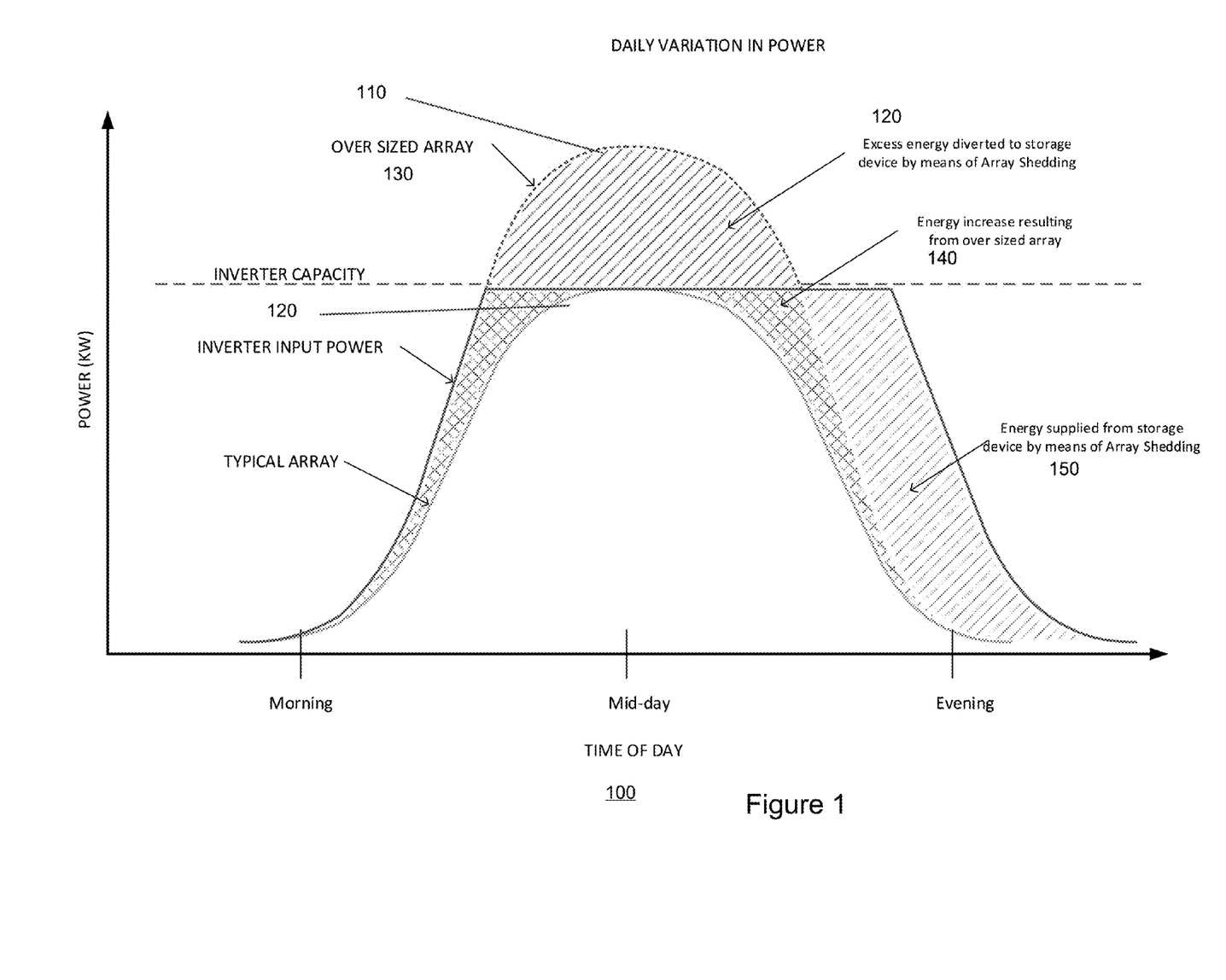
FIG. 1 provides for a schematic representation of daily variation in power by relating power output over daylight hours and time of day.

FIG. 1 provides for a schematic representation 100 of daily variation in power by relating power output over daylight hours and time of day. In accordance with an embodiment of the present invention, from FIG. 1, array-shedding and harvesting is suited in general for periods over the day where power is greater than the inverter capacity, at 110. Typically, traditional approaches are able to accommodate power output up to the inverter capacity less an efficiency of the inverter, such as along 120. In operation, an array-shedding and harvesting approach will provide for higher output power over a longer period of the day in direct relation to the efficiency of the inverter which drives the efficiency of a PV array system since inverters convert direct current (DC) into alternating current (AC). It will also allow for the diversion of power 120 to a storage device as necessary. Similarly, for the present invention, where the inverter is over-sized, additional efficiencies can be gained. In the present invention the oversize array 130 can be utilized to provide excess energy 140 during the day. This energy from the storage device can be provided in the evening 150 for example. In operation, an array-shedding approach will allow for the diverting of excess energy to a harvesting or storage device to allow for energy to be utilized in the evening for example. Additionally, the design of the present invention will also compensate for lower yield environmental factors such as sun blockage from clouds or lower sun angles due to seasonal effects.

Figure 2:
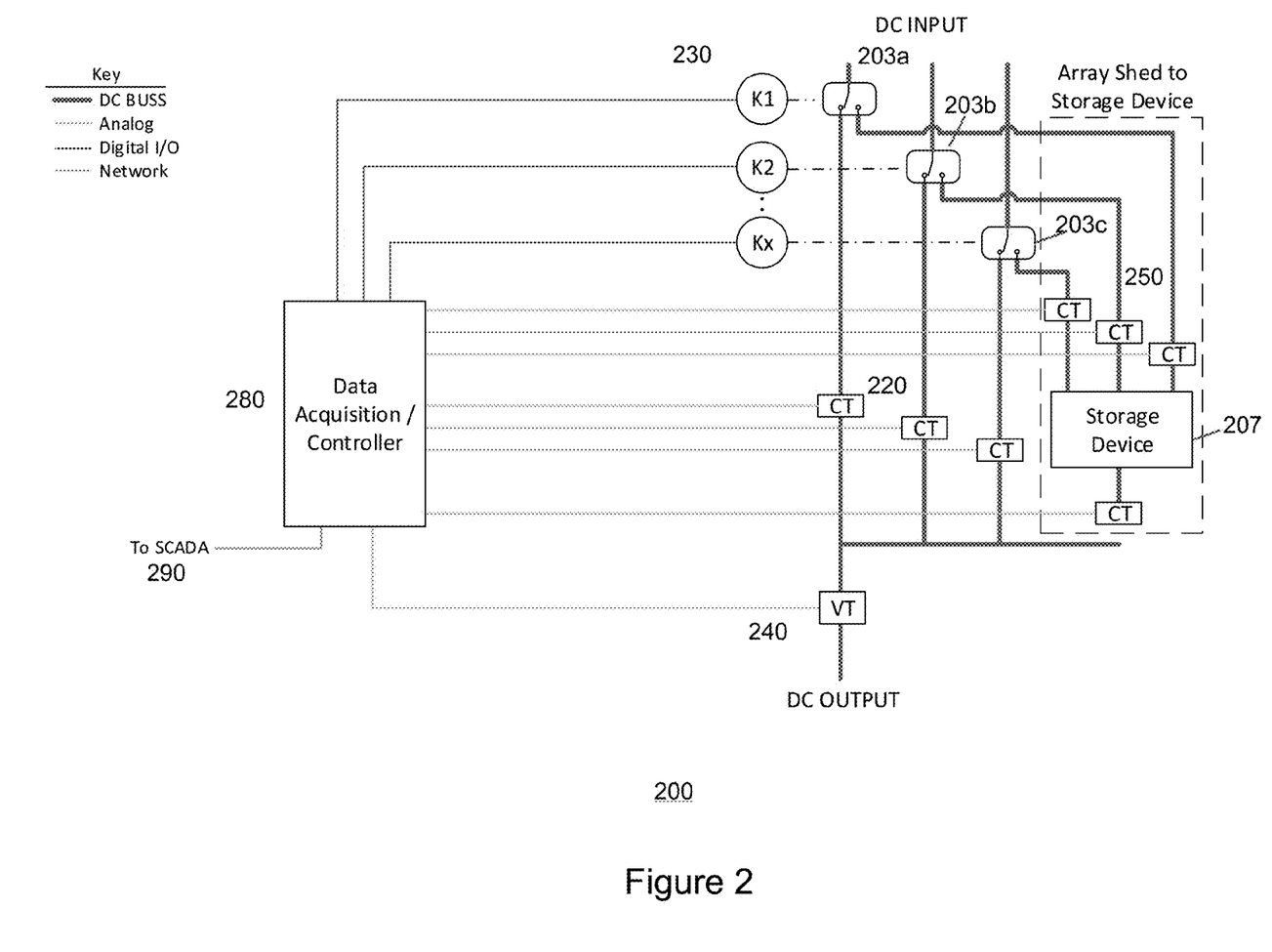
FIG. 2 illustrates a block level schematic of the array-shedding circuit.

FIG. 2 illustrates a block level schematic of the array-shedding circuit 200. For each input that can be disconnected, a first set of contactors is connected in series 220. A current sensor 230 (e.g., K1, K2, . . . Kx) is attached to each of the inputs and a voltage sensor 240 (e.g., VT) is attached to a common output bus. A data acquisition system (DAS) 280 integrates the inverter and program logic control (PLC) for the monitor and control. A network switch provides activity between the supervisory control and data acquisition (SCADA) 290, a type of industrial control system (ICS), and the PLC and DAS 280.

In addition the switches 203a-c are coupled to a second set of contactors 250 that are coupled to a storage device 207 to provide an array shedding and harvesting functionality. The storage device 207 is utilized for harvesting the excess capacity provided by the photovoltaic array for use later.

From FIG. 2, in accordance with one or more embodiments of the present invention, by computing the product of the input current and total output voltage, the system power input to the inverter is determined. When the value of the system power input to the inverter exceeds a predetermined upper threshold limit, the PLC will open one DC contactor, thereby removing one power input from the system. In operation, this process continues until the measured power output to the inverter drops below the predetermined upper threshold.

The present invention, in one or more embodiments, also provides for the situation where if the power output drops below a predetermined lower threshold, the PLC will close one DC contactor, thereby reconnecting one power input to the system. Similar as before, this process continues until the measured power output to the inverter increases above the predetermined lower threshold. In addition by the addition of the storage device the stored power can be utilized at a later time as needed.

FIGS. 3-7 set forth various steps in the process flow of the present invention, in accordance with one or more embodiments.

Figure 3:
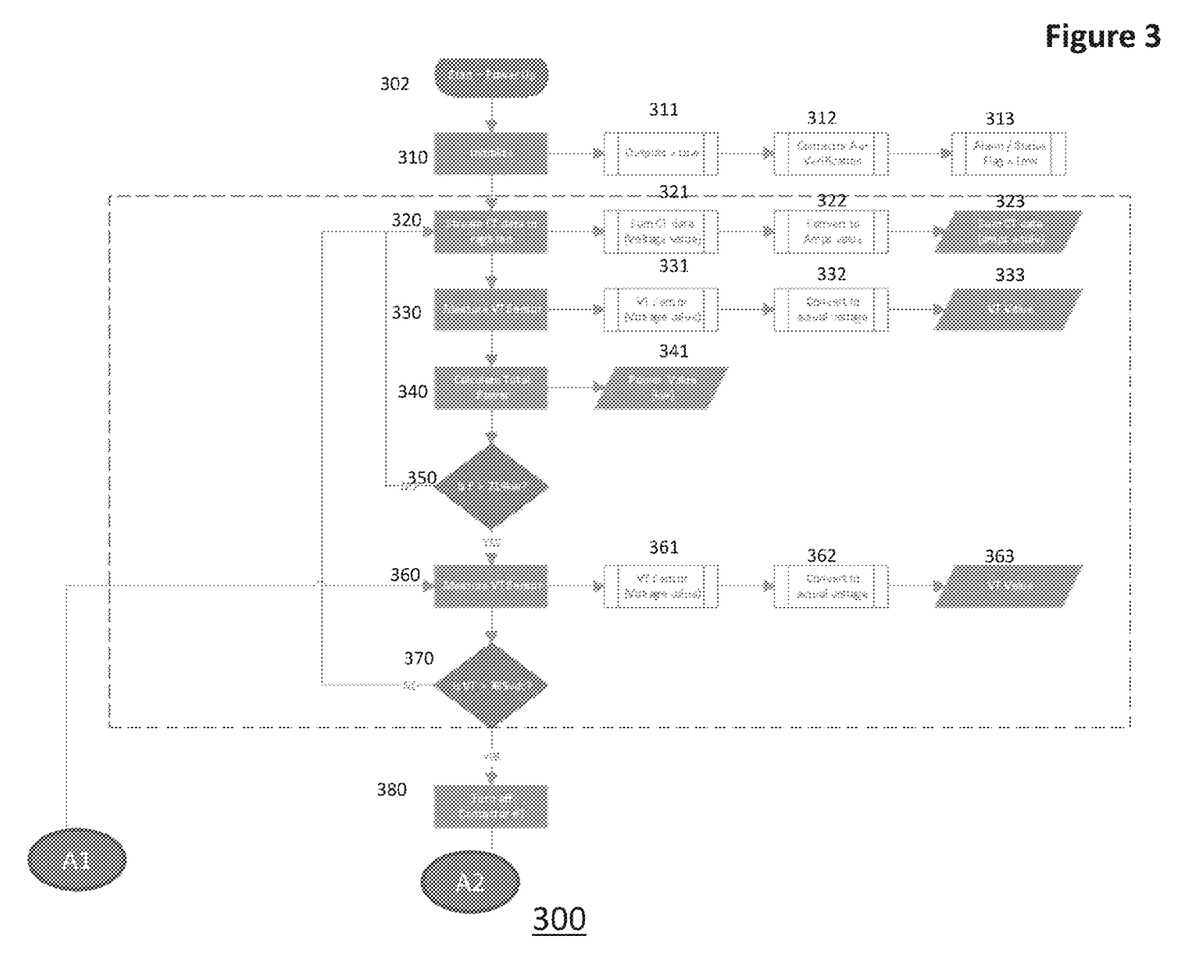
FIGS. 3-7 set forth various steps in the process flow of the present invention, in accordance with one or more embodiments.

From FIG. 3, in accordance with one or more embodiments of the present invention 300, the system is powered up at 302. A discussion of the primary flow follows first where after additional specificity is provided for each primary flow element.

After initialization at 310, streaming of current (CT) data to registers occurs at 320 and voltage (VT) sensors determine measurements at 330. The total power is calculated at 340 whereafter the total power is compared as against a threshold value at 350. If the total power does not exceed the threshold, the system returns to the step of streaming CT data to the registers at 320. If the total power exceeds the threshold value, VT sensors measure the voltage at 360 having inputs from A1 (see FIG. 4) which is then compared with a voltage threshold at 370. If the voltage does not exceed the threshold, the system returns to the step of streaming CT data to the registers at 320. If the voltage does exceed the threshold, a first contactor is turned off at 380 and the process continues to A2, as in FIG. 4.

From FIG. 3, a discussion of details of the primary flow elements now follows, in which it will be appreciated that the details depicted are suggested implementations of the present invention and that modifications to that depicted may also be readily performed. At 310 (initialization), outputs are set to low at 311, the control auxiliary is verified at 312 and an alarm/status flag is set to low at 313. At 320 (streaming CT data to the registers), the step involves summing current data at 321, converting the summed current data to amps at 322 and making available the data in amps equivalent at 323 for further system use. At 330 (voltage sensors determine measurements), the step includes determining a voltage value from the sensors at 331, converting the voltage determined value to the actual voltage at 332 and providing the voltage data for system use at 333. At 340, the total power is calculated and at 341 the calculated power value is provided as data for system use. At 360 (the voltage sensors measuring the voltage), the step includes determining a voltage value from the sensors at 361, converting the voltage determined value to the actual voltage at 362 and providing the voltage data for system use at 363.

Figure 4:
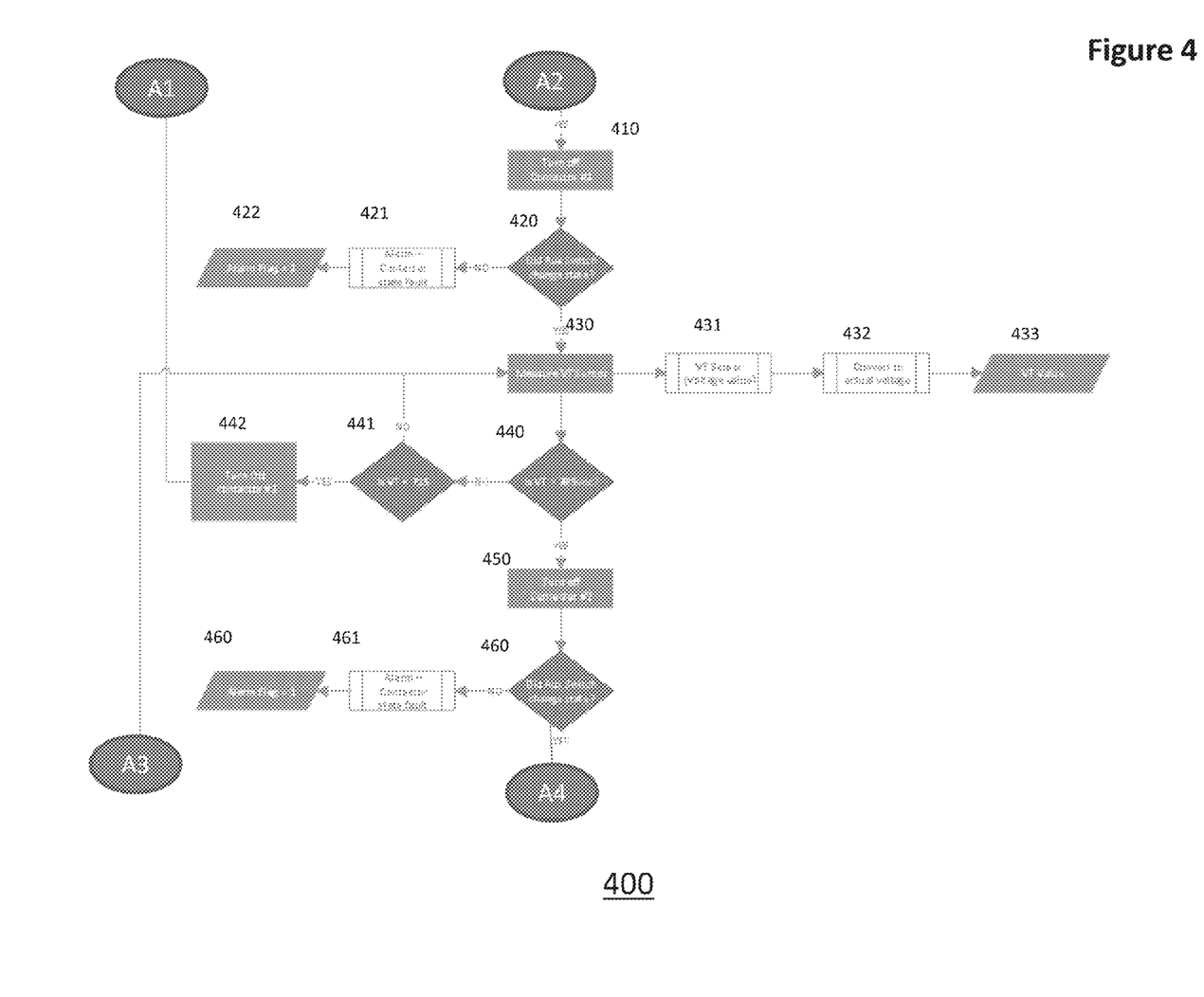

From FIG. 4, the process of FIG. 3 continues 400 with inputs or outputs via A1 and A2. At 410, the contactor is turned off based on input from A2. At 420 a determination of whether the auxiliary switch changed states is evaluated, where if the switch did not change states, the alarm is determined as a contactor state fault at 421 and the alarm flag is set to 1 at 422. If it is determined that the switch did change states at 420, the process continues to measure the VT sensor at 430. At 430, input is received from A3 from FIG. 5. At 430, the step includes determining a voltage value from the sensors at 431, converting the voltage determined value to the actual voltage at 432 and providing the voltage data for system use at 433. The process then continue to 440 where the voltage is compared as against an upper threshold.

At 440, if the voltage does not exceed the upper threshold, it is then determined as to whether it is less than the minimum threshold at 441. If the voltage is not less than the minimum threshold, the process returns to 430. If the voltage is less than the minimum threshold, contactor one is turned on at 442, providing information along A1. If the voltage at 440 does exceed the upper threshold, contactor two is turned off at 450. After contactor two is turned off, a determination of whether the auxiliary switch changed states is evaluated at 460, where if the switch did not change states, the alarm is determined as a contactor state fault at 461 and the alarm flag is set to 1 at 462. If it is determined that the switch did change states at 460, the process continues to A4 of FIG. 5.

Figure 5:
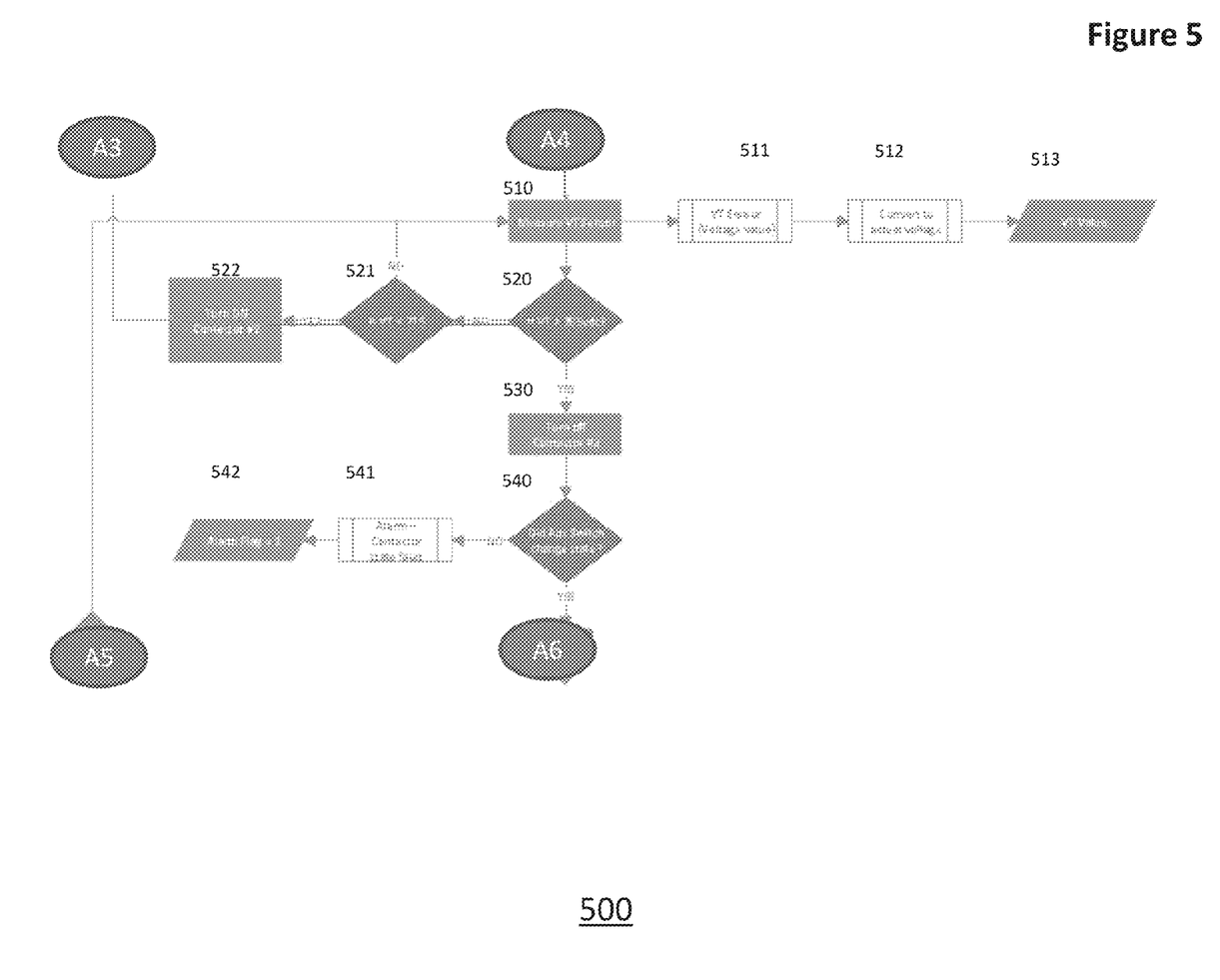

From FIG. 5, the process of FIG. 4 continues 500 with inputs or outputs via A3 and A4. At 510, voltage sensors determine measurements with input from A5 of FIG. 6, and the step includes determining a voltage value from the sensors at 511, converting the voltage determined value to the actual voltage at 512 and providing the voltage data for system use at 513. At 520, if the voltage does not exceed the upper threshold, it is then determined as to whether it is less than the minimum threshold at 521. If the voltage is not less than the minimum threshold, the process returns to 510. If the voltage is less than the minimum threshold, contactor two is turned on at 522, providing information along A3. If the voltage at 520 does exceed the upper threshold, contactor two is turned off at 530.

Once contactor two is turned off at 530, a determination of whether the auxiliary switch changed states is evaluated at 540, where if the switch did not change states, the alarm is determined as a contactor state fault at 541 and the alarm flag is set to 1 at 542. If it is determined that the switch did change states at 540, the process continues to A6 for FIG. 6.

Figure 6:
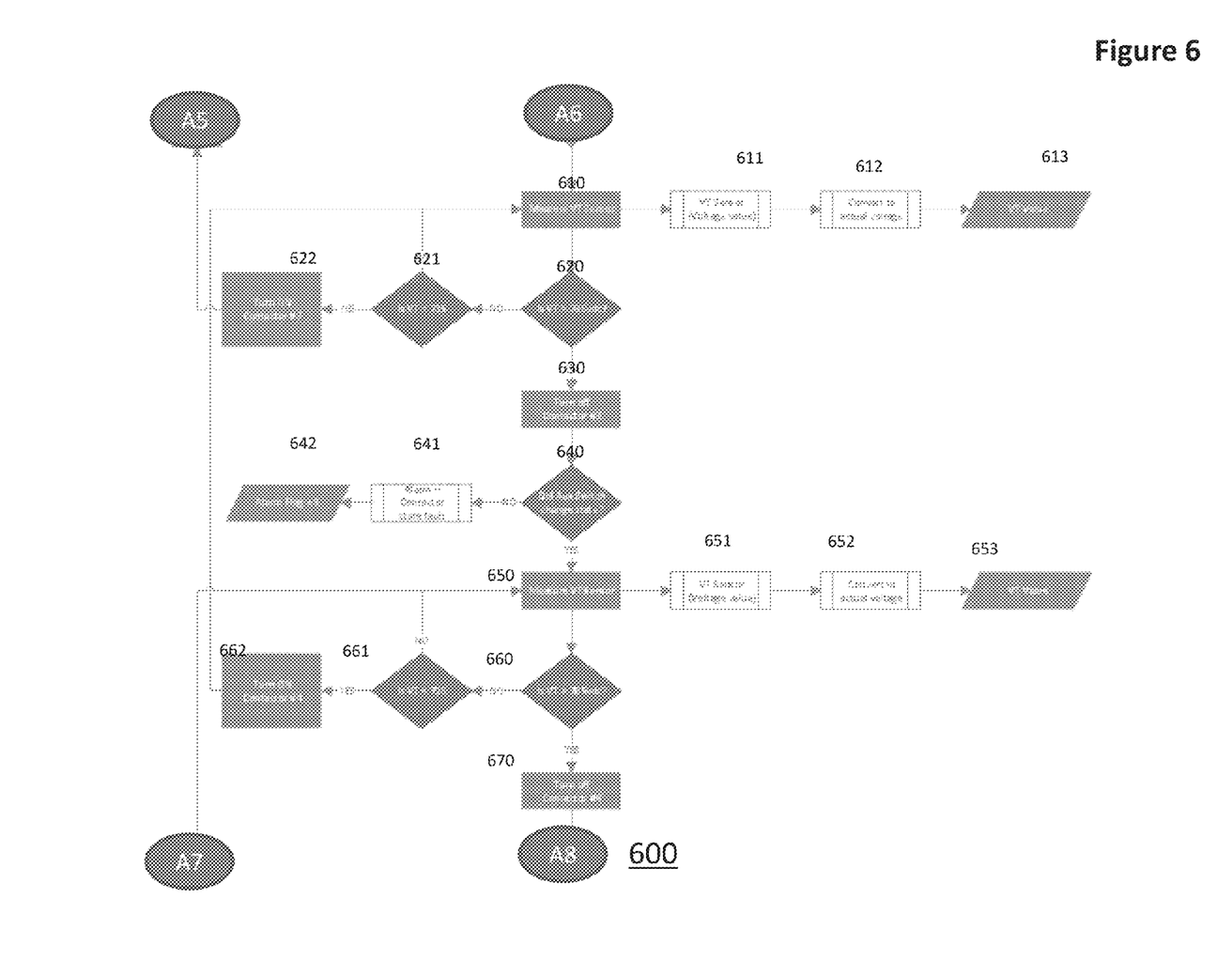

From FIG. 6, the process of FIG. 5 continues 600 with inputs or outputs via A5 and A6. At 610, voltage sensors determine measurements with input from A7 of FIG. 7, the step includes determining a voltage value from the sensors at 611, converting the voltage determined value to the actual voltage at 612 and providing the voltage data for system use at 613. At 620, if the voltage does not exceed the upper threshold, it is then determined as to whether it is less than the minimum threshold at 621. If the voltage is not less than the minimum threshold, the process returns to 610. If the voltage is less than the minimum threshold, contactor three is turned on at 622, providing information along A5. If the voltage at 620 does exceed the upper threshold, contactor three is turned off at 630.

Once contactor three is turned off at 630, a determination of whether the auxiliary switch changed states is evaluated at 640, where if the switch did not change states, the alarm is determined as a contactor state fault at 641 and the alarm flag is set to 1 at 642. If it is determined that the switch did change states at 640, in the process 650 (voltage sensors determine measurements with input from A7 of FIG. 7), the step includes determining a voltage value from the sensors at 651, converting the voltage determined value to the actual voltage at 652 and providing the voltage data for system use at 653. The process continues to 660.

At 660, if the voltage does not exceed the upper threshold, it is then determined as to whether it is less than the minimum threshold at 661. If the voltage is not less than the minimum threshold, the process returns to 650. If the voltage is less than the minimum threshold, contactor four is turned on at 662, providing information along A5. If the voltage at 660 does exceed the upper threshold, contactor four is turned off at 670 and the process continues along A8 to FIG. 7.

Figure 7:
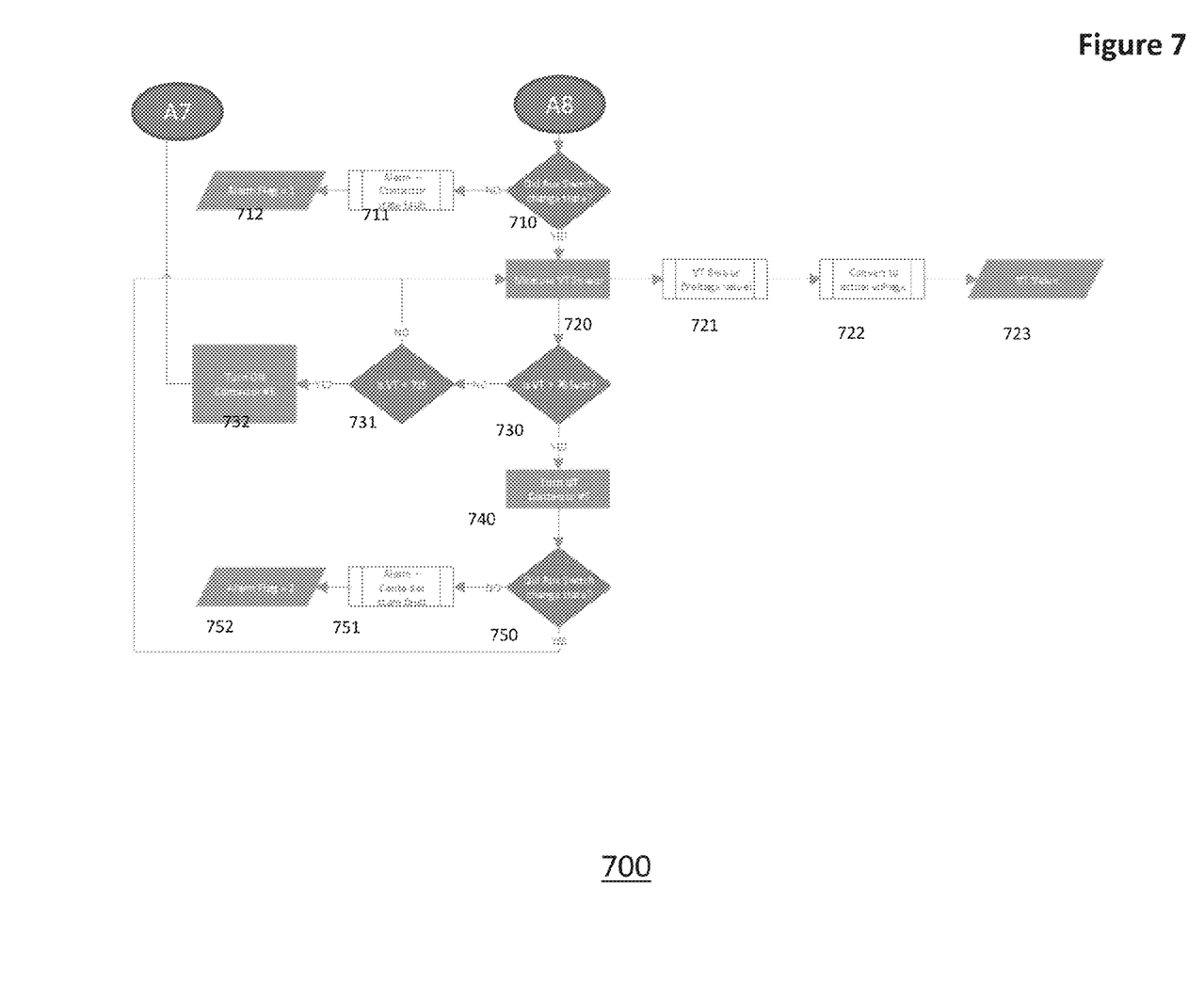

From FIG. 7, the process of FIG. 6 continues 700 with inputs or outputs via A7 and A8. At 710, following input of A8, a determination of whether the auxiliary switch changed states is evaluated at 710, where if the switch did not change states, the alarm is determined as a contactor state fault at 711 and the alarm flag is set to 1 at 712. If it is determined that the switch did change states at 710, the process continues to 720.

At 720, voltage sensors determine measurements with input from output of 750, and the step includes determining a voltage value from the sensors at 721, converting the voltage determined value to the actual voltage at 722 and providing the voltage data for system use at 723. At 730, if the voltage does not exceed the upper threshold, it is then determined as to whether it is less than the minimum threshold at 731. If the voltage is not less than the minimum threshold, the process returns to 720. If the voltage is less than the minimum threshold, contactor five is turned on at 732, providing information along A7. If the voltage at 730 does exceed the upper threshold, contactor five is turned off at 740.

Once contactor five is turned off at 740, a determination of whether the auxiliary switch changed states is evaluated at 750, where if the switch did not change states, the alarm is determined as a contactor state fault at 751 and the alarm flag is set to 1 at 752. If it is determined that the switch did change states at 750, the process continues to 720.

By example, in a preferred embodiment, the upper limit voltage threshold is 785 DC and the lower limit threshold is 715 DC. It will be appreciated that the upper and lower thresholds may be determined based upon the needs of the system based on requirements and implementation needs, where the present invention is not so restricted.

To illustrate how the array shedding and harvesting would operate based upon power, current and voltage respectively refer now to the following discussion in conjunction with the accompanying Figures.

Figure 8A:
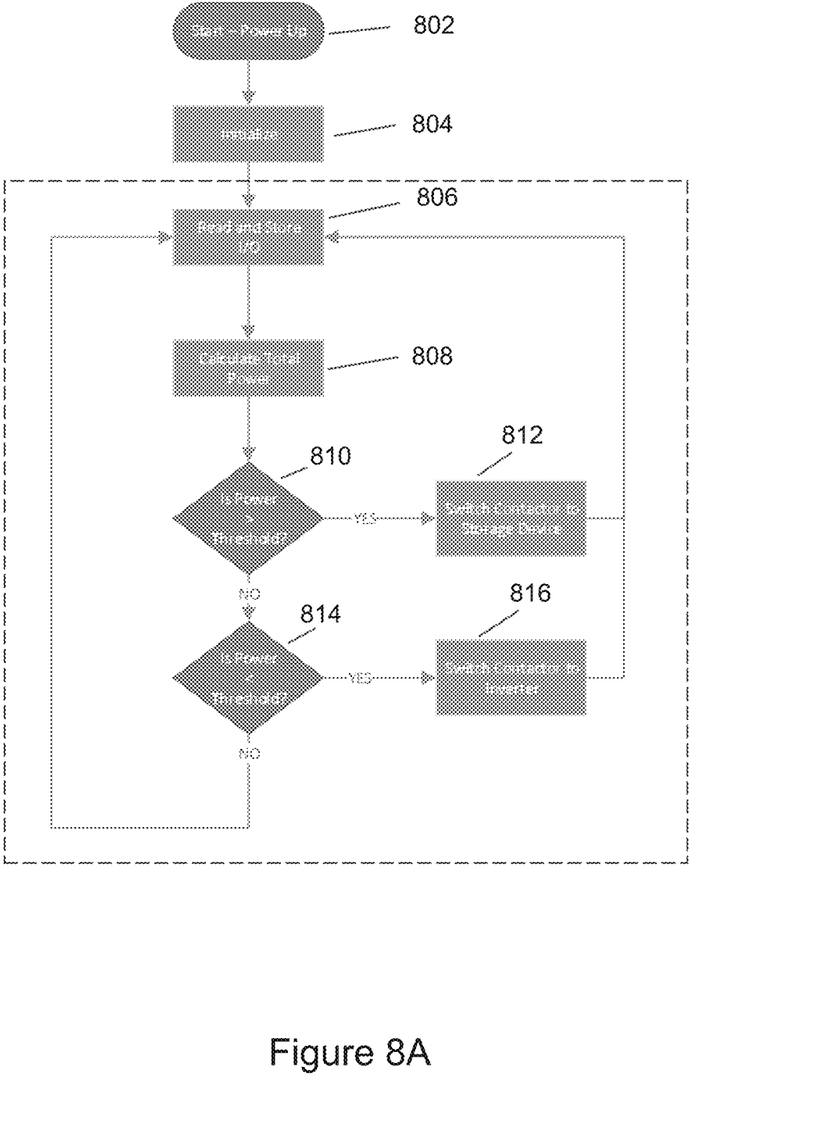
FIG. 8A illustrates simplified control logic for array shedding application based upon power.

FIG. 8A illustrates simplified control logic for an array shedding application based upon power. First, the array shedding and harvesting system is powered up, via step 802. Then, the system is initialized, via step 804. Next, the system reads and stores data related to power into input/output (I/O) registers of the system, via step 806. Thereafter, the total power is then calculated, via step 808. Next, a determination is made on whether the total power is greater than a first predetermined threshold, via step 810. If the total power is greater than the first predetermined threshold, then one or more contactors are switched to the storage device, via step 812, and then the system reads and stores that data into the I/O registers, via step 806. If the total power is not greater than the first threshold, a determination is then made on whether the total power is less than a second predetermined threshold, via step 814. If the total power is less than the second predetermined threshold, one or more contactors are switched to the inverter, via step 816, and then the system reads and stores the power data I/O registers again, via step 806.

Figure 8B:
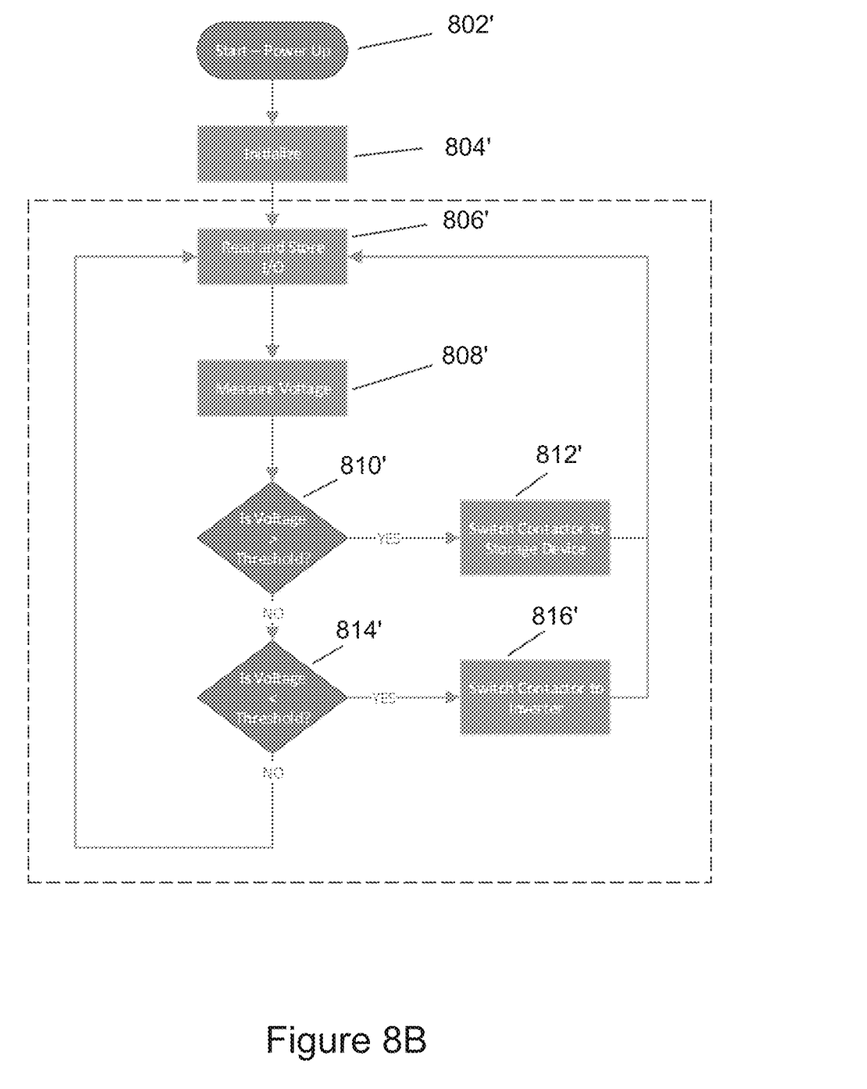
FIG. 8B illustrates simplified control logic for array shedding application based upon voltage.

FIG. 8B illustrates simplified control logic for an array shedding application based upon voltage. First, the array shedding and harvesting system is powered up, via step 802'. Then, the system is initialized, via step 804'. Next, the system reads and stores data related to voltage into the input/output (I/O) registers, via step 806'. Thereafter, the total voltage is then calculated, via step 808'. Next, a determination is made on whether the total voltage is greater than a first predetermined threshold, via step 810'. If the total voltage is greater than the first predetermined threshold, then one or more contactors are switched to the storage device, via step 812', and then the system reads and stores that data into the I/O registers, via step 806'. If the total voltage is not greater than the first threshold, a determination is then made on whether the total voltage is less than a second predetermined threshold, via step 814.' If the total voltage is less than the second predetermined threshold, one or more contactors are switched to the inverter, via step 816', and then the system reads and stores the voltage data I/O registers again, via step 806'.

Figure 8C:
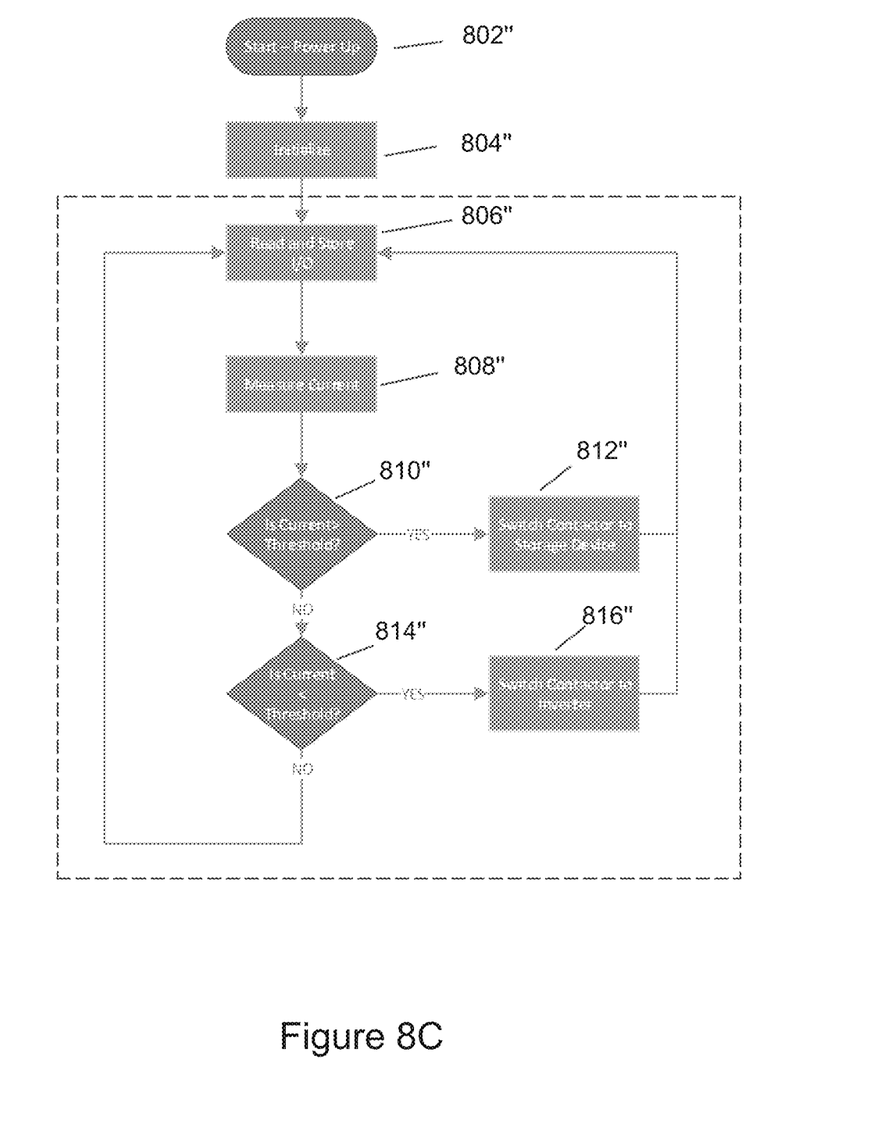
FIG. 8C illustrates simplified control logic for array shedding application based upon current.

FIG. 8C illustrates simplified control logic for an array shedding application based upon current. First, the array shedding and harvesting system is powered up, via 802". Then, the system is initialized, via step 804". Next, the system reads and stores data related to current into the input/output (I/O) registers, via step 806". Thereafter, the total current is then calculated, via step 808". Next, a determination is made on whether the total current is greater than a first predetermined threshold, via step 810". If the total current is greater than the first predetermined threshold, then one or more contactors are switched to the storage device, via step 812", and then the system reads and stores that data into the I/O registers, via step 806". If the total current is not greater than the threshold, a determination is then made on whether the total current is less than a second predetermined threshold, via step 814". If the total current is less than the second predetermined threshold, one or more contactors are switched to the inverter, via step 816", and then the system reads and stores the current data I/O registers again, via step 806".

Figure 9A:
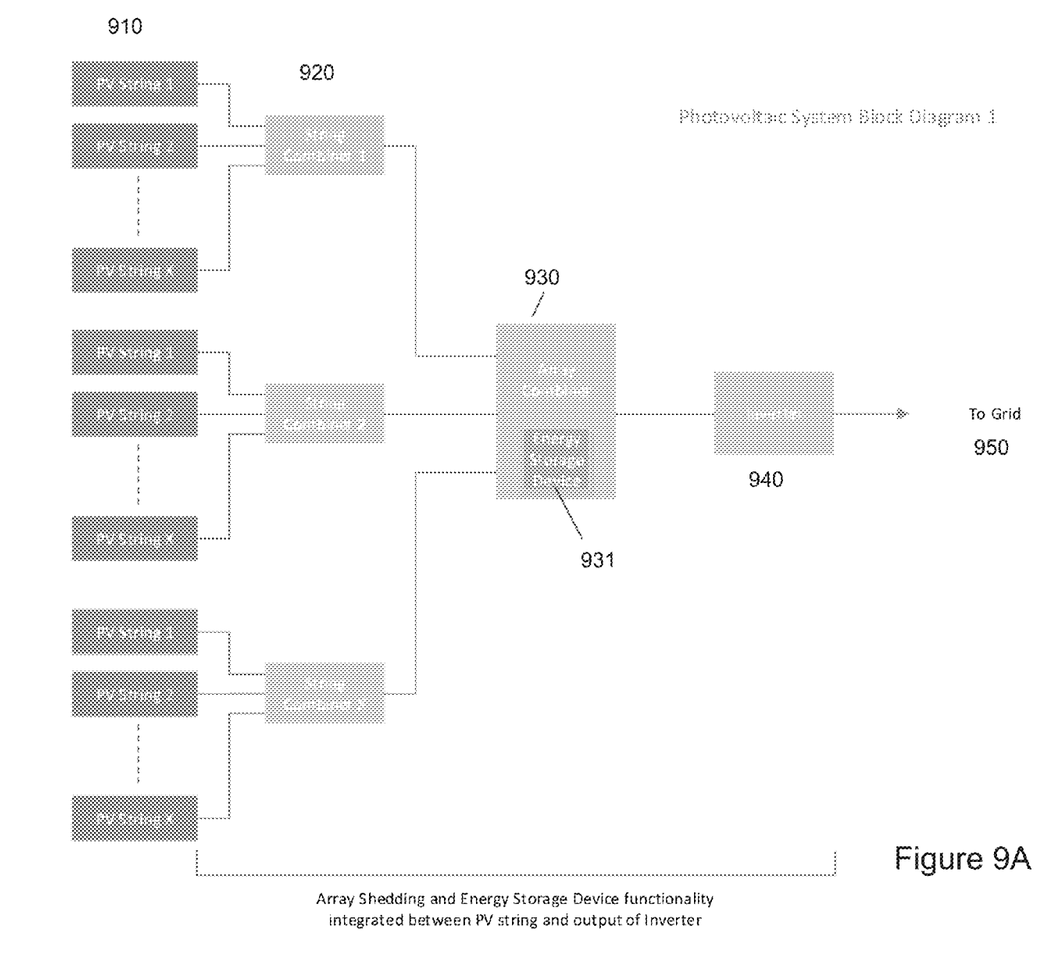
FIG. 9A-9C sets forth various implementations of the present invention in accordance with one or more embodiments, including a plurality of PV strings connected to the grid having array shedding functionality.
Figure 9B:
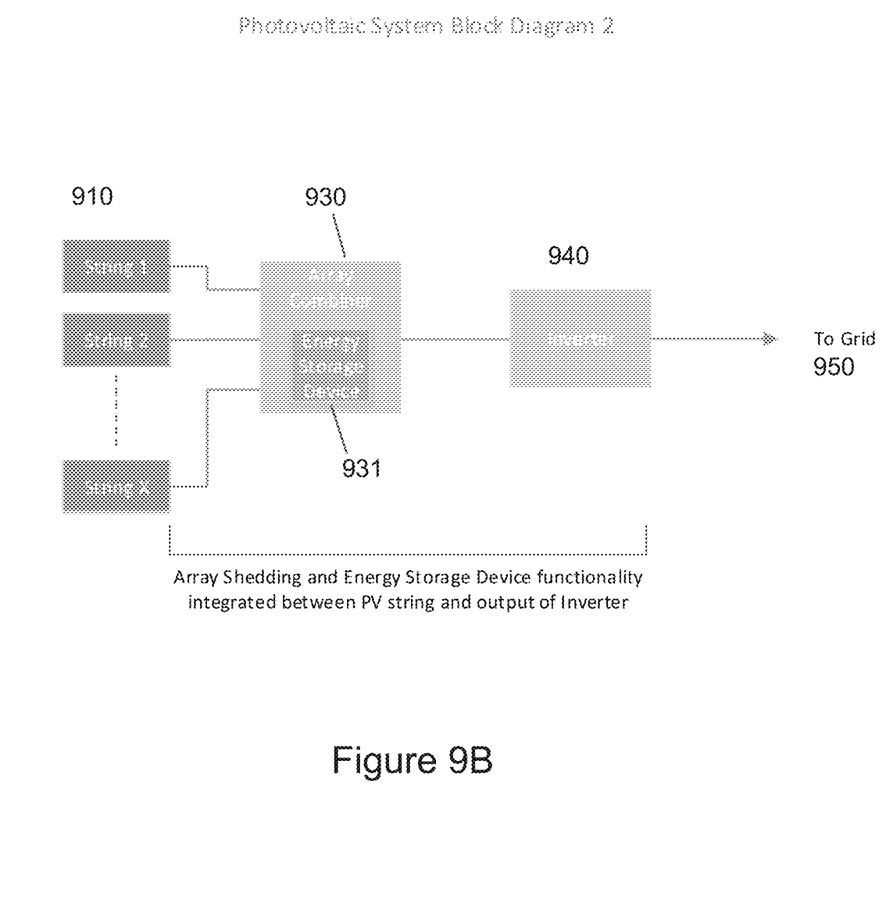
Figure 9C:
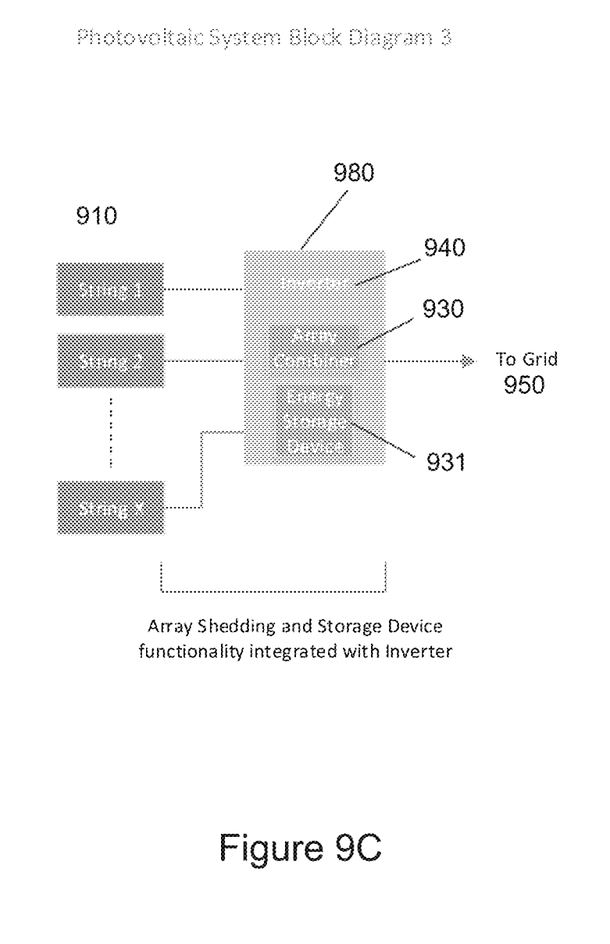

FIGS. 9A-9C set forth an implementation of the present invention in accordance with one or more embodiments, including a plurality of PV strings connected to the grid having array shedding and storage functionality. From FIG. 9A, a plurality of PV strings are arranged at 910 which are connected with string combiners at 920. A plurality of string combiners are connected with an Array combiner at 930. The array combiner 930 includes an energy storage device 931. The Array combiner 930 is connected with an inverter 940 which in turn, is connected with the grid 950. In this embodiment, array shedding and energy storage device functionality is integrated between the PV strings 910 and the output of the inverter 940.

From FIG. 9B, a plurality of PV strings are arranged at 910 which are connected with an Array combiner at 930. The Array combiner includes an energy storage device 931. The Array combiner 930 is connected with an inverter 940 which in turn, is connected with the grid 950. In this embodiment, array shedding and harvesting functionality is integrated between the PV strings and the output of the inverter. From FIG. 9C, a plurality of PV strings are arranged at 910 which are connected with an inverter system 980. The inverter system 980 includes an inverter 940, an Array combiner 930, and an energy storage device 931. The inverter system 980 is connected with the grid 950. In this embodiment, the array shedding and storage functionality is integrated with the inverter.

The present invention provides for an array shedding and harvesting functionality with the functionality integrated as between the PV strings and the output of the inverter. It will also be appreciated that more than one inverters and more than one grid may also be used for the present invention in one or more implementations. Further the array shedding and harvesting functionality may be configured to monitor the inverter and either disconnect or connect inputs of the at least two photovoltaic strings as needed to store power in the storage device or to maintain a maximum allowable power from the photovoltaic strings.

In one or more preferred arrangements, the array shedding and harvesting functionality of the present invention comprises a sensor circuit for monitoring a power output of the at least two photovoltaic strings and either connecting or disconnecting at least one of the at least two photovoltaic strings to maintain the allowable power. In further embodiments, the array shedding functionality of the present invention comprises more than one sensor circuits for monitoring a power output of a plurality of photovoltaic strings providing for turning on or turning off at least one of the plurality of photovoltaic strings to store power in the storage device or to maintain a maximum allowable power from the photovoltaic strings.

It will also be appreciated that the array shedding functionality of the present invention, in one or more embodiments, is preferably integrated between PV strings and the output of the inverter. Various embodiments of the invention provide for sensors integrated on each of the inputs of a power assembly combiner, current sensors used to sense current provided on each of multiple inputs from power sources (PV arrays or combiners), and DC contactors used to control connection of power source inputs. In preferred embodiments, current sensors are connected to a logic controller to determine if and when power source inputs are to be connected. The system and circuit of the present invention is a convenient and beneficial approach having numerous advantages in the field, for example where the present invention increases the duration of operation at the maximum power point of the inverter, providing a longer time with higher output power from the combiner to the inverter increasing the maximum yield time to the inverter.

It will be further appreciated that the present invention may be arranged or situated in a single panel installation or in multiple panel arrangements. In such arrangements, the present invention may be configured such that connectivity across the system is active even where the array shedding functionality is located in a separate panel, for instance. Additionally, the photovoltaic system may include an array shedding functionality which is integrated within at least two string combiners, at least one array combiner, an inverter, or a combination thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art.

What is claimed is:

1. A photovoltaic system comprising:
   an electrical power source configured to provide at least two electrical power outputs;
   at least one inverter configured to input electrical power corresponding to the at least two electrical power outputs of the electrical power source;
   circuitry including a switch configured to controllably switch a destination of the electrical power corresponding to each output of the electrical power source, respectively;
   a sensor configured to determine a voltage of the electrical power input to the at least one inverter; and a controller configured to control diversion of electrical power from one or more of the at least two electrical power outputs of the electrical power source to the electrical power input to the at least one inverter in response to the power of the input to the at least one inverter dropping below a predetermined power threshold.

2. The photovoltaic system of claim 1, further comprising the storage as a destination of the electrical power to store electrical power for later use.

3. The photovoltaic system of claim 2, further comprising:
one or more current sensors coupled to the at least two electrical power outputs of the electrical power source;
wherein the sensor includes a voltage sensor coupled to an output bus;
wherein the controller is further configured to receive signals from the one or more current sensors and voltage sensor and control the diversion in response to the signals from either the one or more current sensors or the voltage sensor, or both of the one or more current sensors and voltage sensor, indicating that the power of the input to the at least one inverter exceeds the predetermined threshold.

4. The photovoltaic system of claim 1, wherein the at least two electrical power outputs comprise a plurality of photovoltaic strings, wherein the photovoltaic system further includes at least one string combiner coupled between the at least one inverter and the plurality of photovoltaic strings.

5. The photovoltaic system of claim 4, wherein the circuitry and sensor are integrated within one of the at least one string combiner.

6. The photovoltaic system of claim 1, wherein the at least two electrical power outputs comprise a plurality of photovoltaic strings; and wherein the photovoltaic system further includes at least two string combiners coupled to the plurality of photovoltaic strings and at least one array combiner between the at least two string combiners and the at least one inverter.

7. The photovoltaic system of claim 6, wherein the circuitry and sensor are integrated within the at least one array combiner.

8. The photovoltaic system of claim 1, wherein the circuitry and sensor are located in a separate panel.

9. The photovoltaic system of claim 8, wherein the circuitry and sensor are connected via a remote panel.

10. The photovoltaic system of claim 1, wherein the circuitry and sensor are integrated within one of the at least one inverter.

11. A photovoltaic array shedding and harvesting circuit comprising:
at least one current sensor for sensing each input of at least two photovoltaic strings,
at least one voltage sensor connected to a common output bus, and
an inverter switch configured to integrate an inverter and a program logic control to monitor and control the inverter and connect each input of the at least two photovoltaic strings as needed to control diversion of power from one or more of the at least two photovoltaic strings to a storage in response to a value of the power input to the inverter exceeding a predetermined upper threshold.

12. The circuit of claim 11, wherein when the value of the power input to the inverter exceeds the predetermined upper threshold, the program logic control will open a first contactor to direct power from a first one of the at least two photovoltaic strings to the storage.

13. The circuit of claim 12, wherein when the value of the power input to the inverter again exceeds the predetermined upper threshold after opening the first contactor, the program logic control will open a second contactor to direct power from a second one of the at least two photovoltaic strings to the storage.

14. The circuit of claim 11, wherein when the value of the power input to the inverter is below a predetermined lower threshold, the program logic control will close a first contactor, add a first power input from one of the at least two photovoltaic strings and divert power to the inverter.

15. The circuit of claim 14, wherein when the value of the power input to the inverter is below the predetermined lower threshold after adding the first power input, the program logic control will close a second contactor, add a second power input from one of the at least two photovoltaic strings and divert power to the inverter.

16. The circuit of claim 11, wherein the photovoltaic array shedding and harvesting circuit is integrated into an array shedding and harvesting photovoltaic system.

17. The circuit of claim 11, wherein array shedding and harvesting functionality of the photovoltaic array shedding and harvesting circuit is integrated within the inverter.

18. The circuit of claim 17, wherein the array shedding and harvesting functionality is located in a separate panel.

* * * * *